United States Patent
Soules et al.

(10) Patent No.: US 7,119,488 B2
(45) Date of Patent: Oct. 10, 2006

(54) OPTIMIZED PHOSPHOR SYSTEM FOR IMPROVED EFFICACY LIGHTING SOURCES

(75) Inventors: Thomas Soules, Livermore, CA (US); William Beers, Chesterland, OH (US); Michael Greci, Mentor, OH (US); Anant Setlur, Niskayuna, NY (US); Holly Comanzo, Niskayuna, NY (US); Venkatesan Manivannan, Rexford, NY (US); Alok Srivastava, Niskayuna, NY (US)

(73) Assignees: General Electric Company, Niskayuna, NY (US); GELcore, LLC, Valley View, OH (US)

( * ) Notice: Subject to any disclaimer, the term of this patent is extended or adjusted under 35 U.S.C. 154(b) by 0 days.

(21) Appl. No.: 11/094,010

(22) Filed: Mar. 30, 2005

(65) Prior Publication Data

US 2005/0179358 A1    Aug. 18, 2005

(51) Int. Cl.
*H01J 63/04* (2006.01)
(52) U.S. Cl. .................. 313/587; 313/485; 313/486; 252/301.4 R
(58) Field of Classification Search ............ 313/485, 313/486, 587; 106/31.14, 31.32, 31.64; 252/301.4 R, 252/301.6 P, 301.35, 301.4; 283/92; 907/7
See application file for complete search history.

(56) References Cited

U.S. PATENT DOCUMENTS

| | | | |
|---|---|---|---|
| 3,569,764 A | 3/1971 | Hanada et al. | |
| 4,806,824 A | 2/1989 | Paynter et al. | |
| 4,874,984 A | 10/1989 | Sigai et al. | |
| 4,891,550 A | 1/1990 | Northrop et al. | |
| 5,049,779 A | 9/1991 | Itsuki et al. | |
| 5,207,948 A | 5/1993 | Wolfe et al. | |
| 5,350,971 A | 9/1994 | Jeong | |
| 5,612,590 A | 3/1997 | Trushell et al. | |
| 5,714,836 A | 2/1998 | Hunt et al. | |
| 5,731,658 A | 3/1998 | Lengyel et al. | |
| 5,731,659 A | 3/1998 | Soules et al. | |
| 5,869,927 A | 2/1999 | Matsuo et al. | |
| 6,116,754 A | 9/2000 | Ocsovai et al. | |
| 6,137,217 A | 10/2000 | Pappalardo et al. | |

(Continued)

FOREIGN PATENT DOCUMENTS

EP    0 993 022 A1    4/2000

(Continued)

OTHER PUBLICATIONS

Inorganic Phosphors: Compositions, Preparation and Optical Properties, CRC Press, 2004.

*Primary Examiner*—Nimesh Patel
*Assistant Examiner*—Anthony Canning
(74) *Attorney, Agent, or Firm*—Fay, Sharpe, Fagan, Minnich & McKee, LLP

(57) ABSTRACT

A fluorescent lamp including a phosphor layer comprising a phosphor blend including four or more optimized phosphors emitting within a specific spectral range to optimize luminosity for a given color rendering index (CRI) and color coordinated temperature (CCT). The blend will include at least four phosphors selected from the following: a blue phosphor having an emission peak at 440–490 nm, a blue-green phosphor having an emission peak at 475–525 nm, a green phosphor having an emission peak at 515–550 nm, an orange phosphor having an emission peak from 550–600 nm, a deep red phosphor having an emission peak at 615–665 nm, and a red phosphor having an emission peak at 600–670 nm.

20 Claims, 4 Drawing Sheets

U.S. PATENT DOCUMENTS

| | | |
|---|---|---|
| 6,222,312 B1 | 4/2001 | Ghosh et al. |
| 6,249,328 B1 | 6/2001 | Fukuzawa et al. |
| 6,294,800 B1 | 9/2001 | Duggal et al. |
| 6,302,959 B1 | 10/2001 | Srivastava et al. |
| 6,369,502 B1 | 4/2002 | Auber et al. |
| 6,400,097 B1 | 6/2002 | Jin et al. |
| 6,402,987 B1 | 6/2002 | Srivastava et al. |
| 6,429,583 B1 | 8/2002 | Levinson et al. |
| 6,472,812 B1 | 10/2002 | Vose et al. |
| 2003/0006694 A1 | 1/2003 | Carter |

FOREIGN PATENT DOCUMENTS

| | | |
|---|---|---|
| EP | 1 184 893 A2 | 3/2002 |

OPTIMIZED PHOSPHOR SYSTEM FOR IMPROVED EFFICACY LIGHTING SOURCES

FIELD OF INVENTION

The present invention relates to phosphor compositions, particularly phosphors for use in fluorescent lamps. More particularly, the present invention relates to improving the efficacy of a fluorescent lamp by providing an optimized blend of four or more phosphors for use therein.

BACKGROUND OF THE INVENTION

Fluorescent lamps typically have a transparent glass envelope enclosing a sealed discharge space containing an inert gas and mercury vapor. When subjected to a current provided by electrodes, the mercury ionizes to produce radiation having primary wavelengths of 185 nm and 254 nm. This ultraviolet radiation, in turn, excites phosphors on the inside surface of the envelope to produce visible light which is emitted through the glass.

Generally, a fluorescent lamp for illumination uses a phosphor which absorbs the 254 nm Hg-resonance wave and is activated so as to convert the ultraviolet luminescence of mercury vapor into visible light. Conventionally, a white-emitting calcium halophosphate phosphor, such as $Ca_{10}(PO_4)_6(F,Cl)_2$:Sb,Mn, has been used to convert the UV light to white light. More recently, in order to improve the color-rendering properties and emission output of fluorescent lamps, efficient illumination of a white color is provided using a three-band type fluorescent lamp which employs the proper mixture of red, green and blue-emitting phosphors have been put to practical use. For example, for the blue-emitting phosphor, europium-activated barium magnesium aluminate phosphor ($BaMg_2Al_{16}O_{27}$:$Eu^{2+}$) for the green-emitting phosphor, cerium and terbium-activated magnesium aluminate phosphor ($(Ce, Tb)MgAl_{11}O_{19}$), and for the red-emitting phosphor, europium-activated yttrium oxide phosphor ($Y_2O_3$:$Eu^{3+}$) may be used and are mixed in an adequate ratio. The combined spectral output of the phosphor blend produces a white light.

In such a three-band type phosphor lamp, the emitting colors of the respective phosphors are considerably different from one another. Therefore, if the emitting intensity of any of the three corresponding phosphors is decreased, color deviation occurs, degrading the color-rendering properties of the lamp.

The apparent color of a light source is described in terms of color temperature, which is the temperature of a black body that emits radiation of about the same chromaticity as the radiation considered. A light source having a color temperature of 3000 Kelvin has a larger red component than a light source having a color temperature of 4100 Kelvin. The color temperature of a lamp using a phosphor blend can be varied by changing the ratio of the phosphors.

Color quality is further described in terms of color rendering, and more particularly color rendering index (CRI or $R_a$), which is a measure of the degree to which the psychophysical colors of objects illuminated by a light source conform to those of a reference illuminant for specified conditions. CRI is in effect a measure of how well the spectral distribution of a light source compares with that of an incandescent (blackbody) source, which has a Planckian distribution between the infrared (over 700 nm) and the ultraviolet (under 400 nm). The discrete spectra which characterize phosphor blends will yield good color rendering of objects whose colors match the spectral peaks, but not as good of objects whose colors lie between the spectral peaks.

The color appearance of a lamp is described by its chromaticity coordinates which can be calculated from the spectral power distribution according to standard methods. See CIE, *Method of measuring and specifying color rendering properties of light sources* (2nd ed.), Publ. CIE No. 13.2 (TC-3, 2), Bureau Central de la CIE, Paris, 1974. The CIE standard chromaticity diagram includes the color points of black body radiators at various temperatures. The locus of black body chromaticities on the x,y-diagram is known as the Planckian locus. Any emitting source represented by a point on this locus may be specified by a color temperature. A point near but not on this Planckian locus has a correlated color temperature (CCT) because lines can be drawn from such points to intersect the Planckian locus at this color temperature such that all points look to the average human eye as having nearly the same color. Luminous efficacy of a source of light is the quotient of the total luminous flux emitted by the total lamp power input as expressed in lumens per watt (LPW or lm/W).

Spectral blending studies have shown that the luminosity and CRI of white light sources are dependent upon the spectral distribution of the individual color phosphors. It is expected that such phosphors preserve structural integrity during extended lamp operation such that the phosphors remain chemically stable over a period of time while maintaining stable CIE color coordinates of the lamp. The human eye does not have the same sensitivity to all visible light wavelengths. Rather, light with the same intensity but different wavelengths will be perceived as having different luminosity. The use of tri-phosphor blends have led to improvements in color rendering and lumen maintenance as compared to single phosphor lamps. Nevertheless, the efficacy of such tri-phosphor lamps is less than it could be due to the fact that the phosphors have emissions in regions where the eye sensitivity is low.

Thus, a need exists for a phosphor blend that better matches the eye sensitivity curve. The use of four phosphor blends having each phosphor within specific spectral regions will better match the eye sensitivity, leading to improved efficacy of various lighting sources in which they are used while maintaining the CRI of lights using conventional phosphor blends.

SUMMARY OF THE INVENTION

In one aspect, the invention provides a lighting source having an improved luminosity for a given color rendering index (CRI) and correlated color temperature (CCT), the lighting source comprising a phosphor blend including at least one of each of a blue phosphor having an emission peak at 440–490 nm or a blue-green phosphor having an emission peak at 475–525 nm, a green phosphor having an emission peak at 515–550 nm, an orange phosphor having an emission peak from 550–600 nm, and a red phosphor having an emission peak at 600–670 nm.

In a second aspect, the invention provides a lighting source having an improved luminosity for a given color rendering index and color coordinated temperature, the lighting source comprising a phosphor blend including at least one of each of a blue phosphor having an emission peak at 440–490 nm, a blue-green phosphor having an emission peak at 475–525 nm, a green phosphor having an emission peak at 515–550 nm, and a red phosphor having an emission peak at 600–670 nm.

In a third aspect, the invention provides a lighting source having an improved luminosity for a given color rendering index and color coordinated temperature, the lighting source comprising a phosphor blend including at least one of each of a blue phosphor having an emission peak at 440–490 nm, a blue-green phosphor having an emission peak at 475–525 nm, a green phosphor having an emission peak at 515–550 nm, an orange phosphor having an emission peak from 550–600 nm, a red phosphor having an emission peak at 600–670 nm, and a deep red phosphor having an emission peak at 615–665 nm.

DETAILED DESCRIPTION OF THE INVENTION

Figure 1:
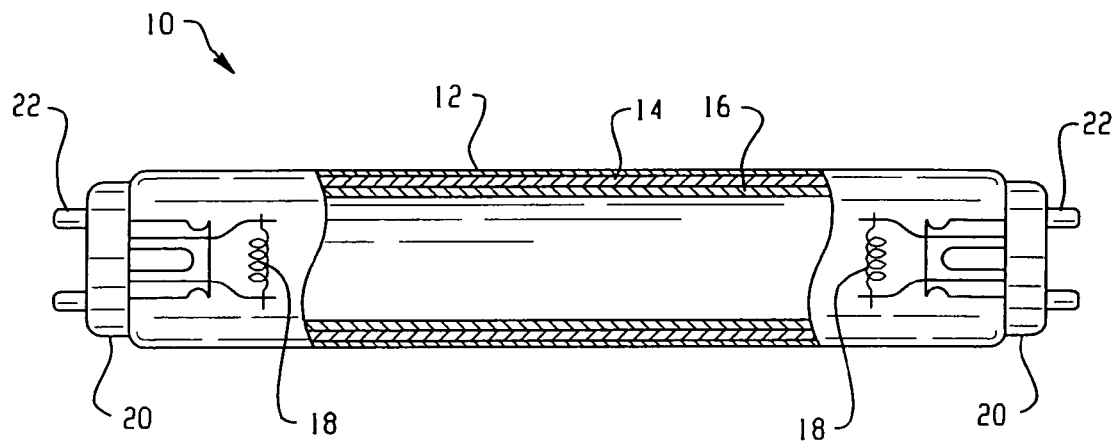
FIG. 1 is a schematic cross-section of a fluorescent lamp.

Referring to FIG. 1, there is depicted a representative fluorescent lamp 10 comprising an elongated soda-lime silicate glass envelope 12 having a circular cross-section. The low pressure mercury discharge assembly in said lamp includes a pair of spaced conventional electrode structures 18 at each end connected to electrical contacts 22 of a base 20 fixed at both ends of the sealed glass envelope. The discharge-sustaining filling in said sealed glass envelope is an inert gas such as argon or a mixture of argon and other rare earth gases at a low pressure in combination with a small quantity of mercury to provide the low vapor pressure manner of lamp operation. Deposited on the inner surface of the glass envelope is a phosphor blend layer 14 comprising a blend of phosphors as described herein below. In one embodiment of the invention, the lamp 10 may have a second layer of material 14 positioned between the phosphor blend layer 16 and the inner surface of the glass envelope 12. This second layer can be an ultraviolet reflecting barrier layer as is known in the art. Such a barrier layer can comprise, for example, a mixture of alpha- and gamma-aluminum particles.

The above illustrated phosphor layer coatings can be formed by various already known procedures including deposition from liquid suspensions and electrostatic deposition. For example, the phosphor can be deposited on the glass surface from a conventional aqueous suspension including various organic binders and adherence promoting agents. Said aqueous suspension is applied and then dried in the conventional manner.

The phosphors for use in the present invention may be made by any conventional method including a ceramic powder method, such as a liquid phase (flux) method or a solid state method. Preferably, the method of making the phosphor comprises the following steps. First, compounds of the phosphor material are mixed in a crucible or another suitable container, such as a ball mill. For example, the starting materials may be blended using a ball mill with $ZrO_2$ or yttrium toughened zirconia milling media. The preferred starting phosphor compounds comprise oxides, carbonates, hydroxides, nitrates or oxalates of the metal constituents, although other starting materials may be used. For example, to form $SrAl_{14}O_{25}$:$Eu^{3+}$, strontium carbonate ($SrCO_3$), aluminum oxide (aluminate, $Al_2O_3$), and $Eu_2O_3$ may be mixed in the crucible or ball mill.

The blended materials may then fired in air or a reducing atmosphere for 5–15 hours at 1400 to 1600° C., preferably for 10 hours at 1500° C. to sinter the material. The reducing atmosphere may comprise forming gas (2 percent hydrogen and 98 percent nitrogen). Preferably, the starting materials also contain a flux that promotes the reaction of the starting materials during the firing step to form the ceramic phosphor. Preferably, the flux comprises a halogen compound, such as a fluoride or a chloride compound. The preferred halogen compounds comprise magnesium, aluminum or strontium fluoride or magnesium, strontium, manganese or ammonium chloride. However, the phosphor may be fired without adding a flux. The fired mixture is then coated onto the substrate, such as a lamp bulb, as described above. Preferably, a suspension of the mixture particles and a liquid is used to coat the substrate.

The inventors have found that it is possible to further improve the efficacy of current lighting sources utilizing phosphor emissions by optimizing the phosphor blend to better match the eye sensitivity curve. As used herein, the terms "luminosity" and "luminous efficacy" are synonymous. It has been discovered that the use of 4 or more phosphors having their peak emissions within specific spectral regions will lead to improvements in the luminosity of various lighting sources. For convenience, the discussion and examples described herein refer to the use of the optimized phosphor blend of the present invention in Hg-based fluorescent lamps. However, it should be recognized that the inventive concepts include applications relating to other light sources incorporating phosphors as well, such as white LED's, xenon based discharge lamps, and plasma display panels.

In one embodiment of the present invention, an optimized phosphor blend for use in a light source having a color rendering index of from about 70 to about 85 resulting in improved luminosity over conventional tri-phosphor blends for a given color temperature is provided. The phosphor blend includes a blend of at least one of each of a blue phosphor having an emission peak at 440–490 nm or a blue-green phosphor having an emission peak at 475–525 nm, a green phosphor having an emission peak at 515–550 nm, an orange phosphor having an emission peak from 550–600 nm, and a red phosphor having an emission peak at 600–670 nm. The above-described combination of phosphors will result in increased luminosity over conventional tri-phosphor blends due to their increased emission in the spectral regions in which the eye is particularly sensitive. The correlated color temperature (CCT) of the blend will range from about 2700–10000 K, depending on the identity and exact mass fraction of each phosphor in the system. For example, it is known that the CCT will increase as the relative amount of blue phosphor in the blend increases and the red phosphor decreases.

In a second embodiment of the present invention, an optimized phosphor blend for use in a light source having a color rendering index of from about 85 to about 93 resulting in improved luminosity over conventional tri-phosphor blends for a given color temperature is provided. The phosphor blend includes a blend of at least one of each of a blue phosphor having an emission peak at 440–490 nm, a blue-green phosphor having an emission peak at 475–525 nm, a green phosphor having an emission peak at 515–550 nm, and a red phosphor having an emission peak at 600–670 nm. The above-described combination of phosphors will result in increased luminosity over conventional tri-phosphor blends due to their increased emission in the spectral regions in which the eye is particularly sensitive. The color correlated temperature (CCT) of the blend will range from about 2700–10000 K, depending on the identity and exact mass fraction of each phosphor in the system.

In a third embodiment of the present invention, an optimized phosphor blend for use in a light source having a color rendering index of 93 or greater resulting in improved luminosity over conventional tri-phosphor blends for a given color temperature is provided. The phosphor blend includes a blend of at least one of each of a blue phosphor having an emission peak at 440–490 nm, a blue-green phosphor having an emission peak at 475–525 nm, a green phosphor having an emission peak at 515–550 nm, an orange phosphor having an emission peak from 550–600 nm, a red phosphor having an emission peak at 600–670 nm, and a deep red phosphor having an emission peak at 615–665 nm. The color correlated temperature (CCT) of the blend will range from about 2700–10000 K, depending on the identity and exact mass fraction of each phosphor in the system.

The phosphors suitable for use in the embodiments of the present invention include any that are capable of absorbing ultraviolet light and emitting light in the stated region. Although not intended to be limiting, examples of suitable phosphors of each type are listed below:

Blue:
$(Ba,Sr,Ca)_5(PO_4)_3(Cl,F,OH):Eu^{2+}, Mn^{2+}, Sb^{3+}$
$(Ba,Sr,Ca)MgAl_{10}O_{17}:Eu^{2+},Mn^{2+}$
$(Ba,Sr,Ca)BPO_5:Eu^{2+}, Mn^{2+(Sr,Ba)}MgAl_{10}O_{17}:Eu^{2+(Sr,Ca,Ba)}_5(PO_4)_4Cl:Eu^{2+(Ba,Ca)}_5(PO_4)_3Cl:Eu^{2+}$ Blue-Green:
$Sr_4Al_{14}O_{25}:Eu^{2+}$
$BaAl_8O_{13}:Eu^{2+}$
$2SrO-0.84P_2O_{5-0.16}B_2O_3:Eu^{2+}$
$MgWO_4$
$BaTiP_2O_8$
$(Ba,Sr,Ca)MgAl_{10}O_{17}:Eu^{2+},Mn^{2+}$
$(Ba,Sr,Ca)_5(PO_4)_3(Cl,F,OH):Eu^{2+},Mn^{2+}, Sb^{3+}$ Green:
$LaPO_4:Ce^{3+}, Tb^{3+}$
$CeMgAl_{11}O_{19}:Tb^{3+}$
$GdMgB_5O_{10}:Ce^{3+}, Tb^{3+}, Mn^{2+}$
$(Ba,Sr,Ca)MgAl_{10}O_{17}:Eu^{2+}Mn^{2+}$
$Zn_2(Si,Ge)O_4:Mn^{2+}$
$SrAl_xO_{(1+3/2x)}:Eu^{2+}$ (x=2–2.4)
$(Ba,Sr,Ca)_2SiO_4:Eu^{2+}$
$GdB_3O_6:Ce^{3+},Mn^{2+}$ Orange:
$(Y,In,Gd,La,Lu,Sc)BO_3:Eu^{3+}$
$YVO_4:Dy^{3+}$
$GdMgB_5O_{10}:Ce^{3+}, Dy^{3+}$
$(Tb, Y, Lu, La, Gd)_3(Al,Ga)_5O_{12}:Ce^{3+}$
$(Ba,Sr,Ca)_5(PO_4)_3(Cl,F,OH):Eu^{2+},Mn^{2+}, Sb^{3+}$
$(Sr, Ba)GdB_8O_{16}:Eu^{3+}$ Red:
$(Y,Gd,La,Lu, Sc)_2O_3:Eu^{3+}$
$(Y,Gd, La, In, Lu, Sc)BO_3:Eu^{3+}$
$(Y,Gd,La)(Al,Ga)O_3:Eu^{3+}$
$(Ba,Sr,Ca)(Y,Gd, La, Lu)_2O_4:Eu^{3+}$
$(Y,Gd)Al_3B_4O_{12}:Eu^{3+}$
monoclinic $Gd_2O_3:Eu^{3+}$
$(Gd,Y)_4(Al,Ga)_2O_9:Eu^{3+}$
$(Ca,Sr)(Gd,Y)_3(Ge,Si)Al_3O_9:Eu^{3+}$
$YVO_4:Eu^{3+}$
$(Y,Gd,La,Lu)_3GaO_6:Eu^{3+}$
$(Sr,Mg)_3(PO_4)_2:Sn^{2+}$
$3.5MgO-0.5MgF_2—GeO_2:Mn^{4+}$
$GdMgB_5O_{10}:Ce^{3+},Mn^{2+}$ Deep Red:
$(Sr,Mg)_3(PO_4)_2:Sn^{2+}$
$3.5MgO-0.5MgF_2—GeO_2:Mn^{4+}$
$GdMgB_5O_{10}:Ce^{3+},Mn^{2+}$ As stated, the relative proportions of the individual phosphors in the present phosphor blends are such that when blended, their emission will produce visible white light of predetermined CCT value between 2700 and 10000 K. The blends will exhibit enhanced luminous efficacy over current tri-phosphor blends for a given CRI and CCT.

The relative proportions of the individual phosphors in the phosphor blend may be adjusted such that when their emissions are blended, there is produced visible light of predetermined x and y values of CIE coordinates wherein the x value is in the range of about 0.30 to about 0.40, and said y value is in the range of about 0.30 to about 0.40. Additionally, the relative proportions of the components are such that the resulting light exhibits an increased luminous efficacy as compared to a tri-component blend formed from a tri-phosphor component blend consisting of one each of a conventional green, red and blue phosphor. The relative amounts of each phosphor can be described in terms of spectral weight. The spectral weights of all the individual phosphors should add up to 1. Although not intended to be limiting, the phosphor blend of the present invention may generally contain about 0.0–0.3 of a blue phosphor, about 0.0–0.3 of a blue-green phosphor, about 0.25–0.6 of a green phosphor, about 0.0–0.55 of a red phosphor, about 0.0–0.55 of an orange phosphor and about 0.0–0.3 of a deep red phosphor.

The following examples are provided to enable those skilled in the art to more clearly understand and practice the invention. The invention is in no way limited to the examples.

EXAMPLES

Spectral calculations were performed for fluorescent lamps utilizing different phosphor blends. The results of these calculations were compared to lamps prepared with known tri-phosphor blends with the same color correlated temperature and the same or similar CRI's. When compared to conventional tri-phosphor blend lamps having the same CRI value, the present lamps showed improved luminosity (and thus greater efficacy) on the order of 2–7%. All of the following examples were prepared to provide a lamp having a CCT of 4100 K for ease of comparison.

Example 1

Figure 2:
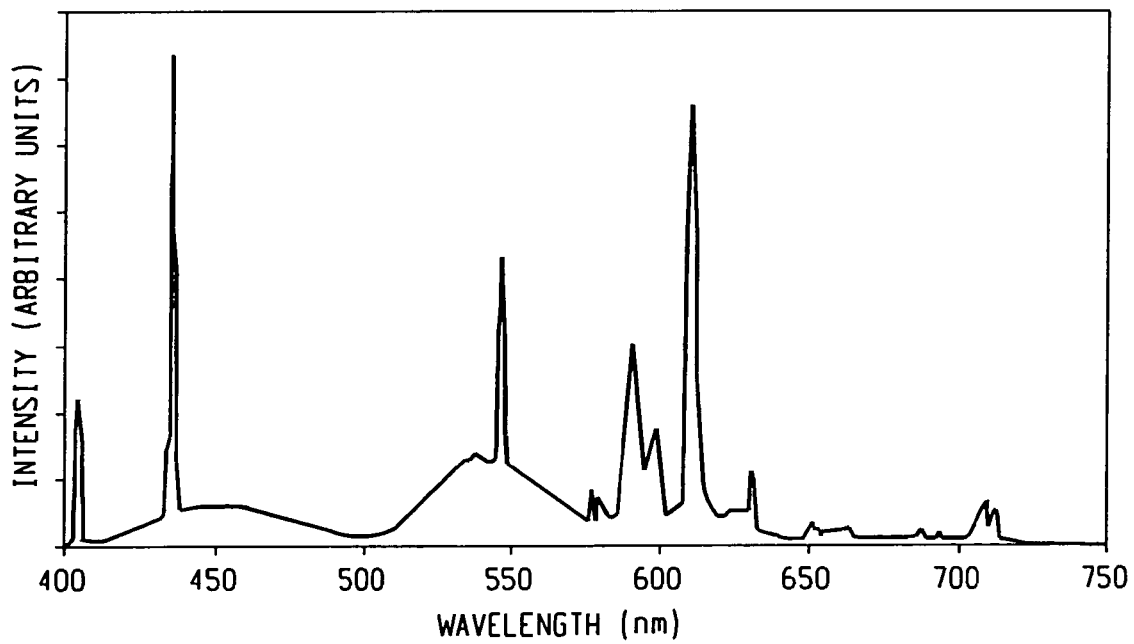
FIG. 2 is a plot of light output versus wavelength for a lamp having a phosphor layer according to a first embodiment of the invention.

A lamp having a CRI of 75 may be prepared using a phosphor blend comprising $BaMgAl_{10}O_{17}:Eu^{2+}$, $Zn_2SiO_4$:

Ge$^{4+}$,Mn$^{2+}$, (Y,In)BO$_3$:Eu$^{3+}$, and Y$_2$O$_3$:Eu$^{2+}$. The resulting emission spectra of the blend is shown in FIG. 2. The resulting lamp had a calculated luminosity at 4100 K that was 2.6% greater than a lamp having a CRI of 83 prepared using a known tri-phosphor blend comprising BaMgAl$_{10}$O$_{17}$:Eu$^{2+}$, LaPO$_4$:Ce$^{3+}$,Tb$^{3+}$, and Y$_2$O$_3$:Eu$^{3+}$.

Example 2

Figure 3:
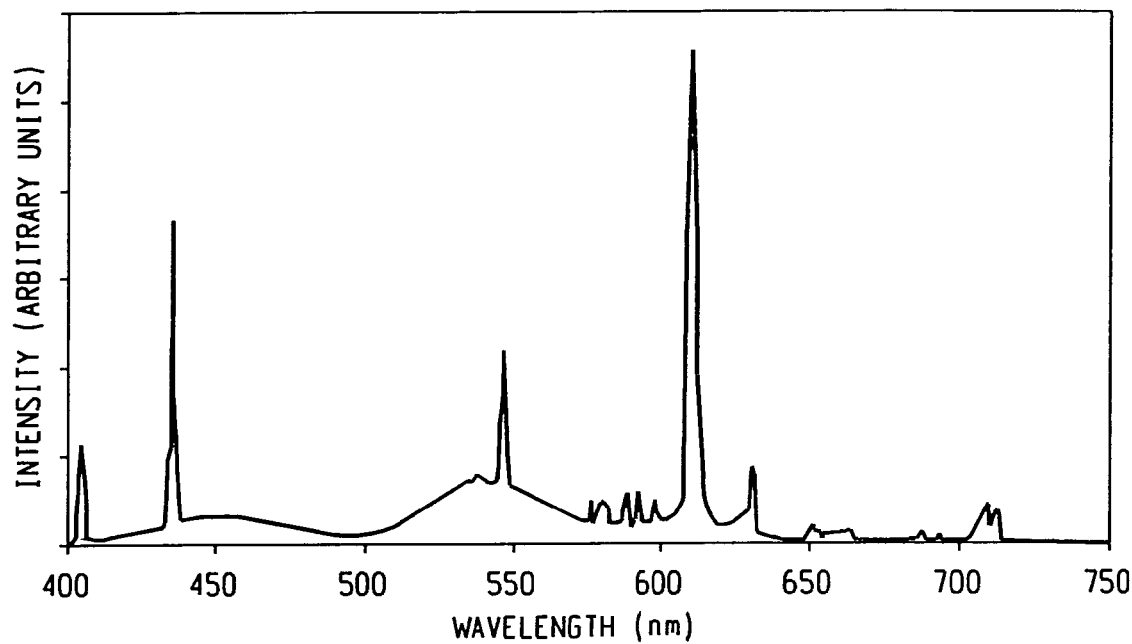
FIG. 3 is a plot of light output versus wavelength for a lamp having a phosphor layer according to a second embodiment invention.

A lamp having a CRI of 82.5 may be prepared using a phosphor blend comprising BaMgAl$_{10}$O$_{17}$:Eu$^{2+}$, Zn$_2$SiO$_4$:Ge$^{4+}$,Mn$^{2+}$, and Y$_2$O$_3$:Eu$^{2+}$. The resulting emission spectra of the blend is shown in FIG. 3. The resulting lamp had a calculated luminosity at 4100 K that was 1.8% greater than a lamp having a CRI of 83 prepared using a known tri-phosphor blend comprising BaMgAl$_{10}$O$_{17}$:Eu$^{2+}$, LaPO$_4$:Ce$^{3+}$, Tb$^{3+}$, and Y$_2$O$_3$:Eu$^{3+}$.

Example 3

Figure 4:
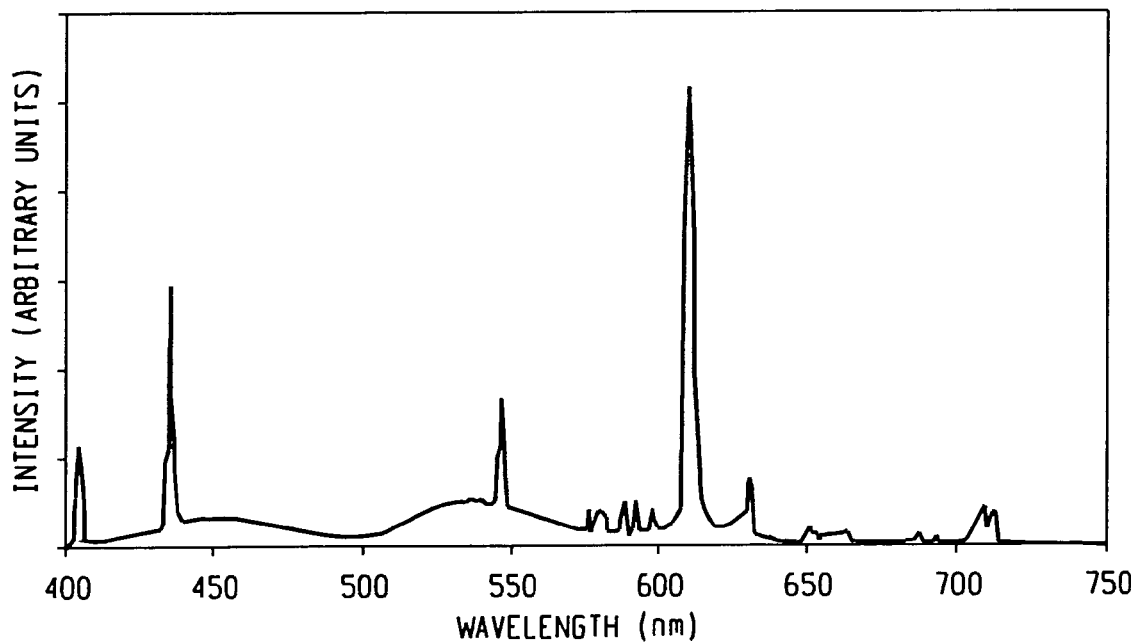
FIG. 4 is a plot of light output versus wavelength for a lamp having a phosphor layer according to a third embodiment of the invention.

A lamp having a CRI of 87 may be prepared using a phosphor blend comprising BaMgAl$_{10}$O$_{17}$:Eu$^{2+}$, Zn$_2$SiO$_4$:Ge$^{4+}$, Mn$^{2+}$, Y$_2$O$_3$:Eu$^{2+}$, and BaMgAl$_{10}$O$_{17}$:Eu$^{2+}$,Mn$^{2+}$. The resulting emission spectra of the blend is shown in FIG. 4. The resulting lamp had a calculated luminosity at 4100 K that was 1.7% lower than a lamp having a CRI of 83 prepared using a known tri-phosphor blend comprising BaMgAl$_{10}$O$_{17}$:Eu$^{2+}$, LaPO$_4$:Ce$^{3+}$, Tb$^{3+}$, and Y$_2$O$_3$:Eu$^{3+}$. It is well known that at higher CRI values, there is an inherent tradeoff between luminosity and CRI. Thus, although the lamp having a CRI of 87 has a slightly lower lumen output compared to the known tri-phosphor lamp, it has a higher CRI and the reduced luminosity is actually superior to other known lamps having such a high CRI.

Example 4

Figure 5:
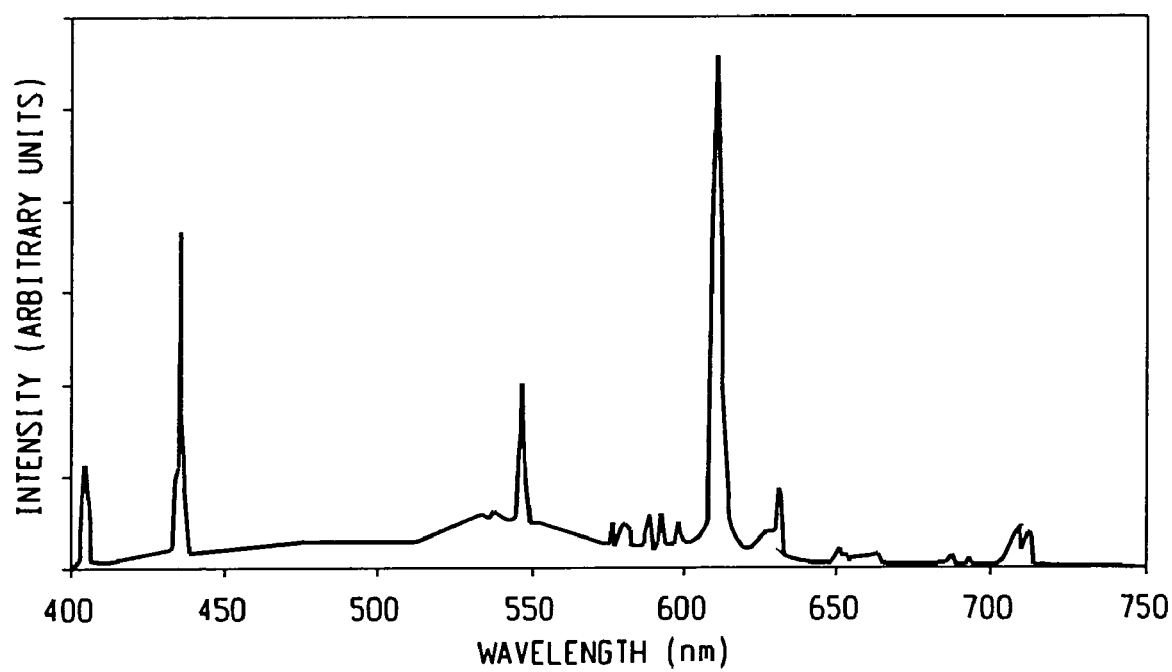
FIG. 5 is a plot of the CIE chromaticity diagram.

Lamps having CRI's from 90–93 may be prepared using a phosphor blend comprising BaMgAl$_{10}$O$_{17}$:Eu2+, Zn$_2$SiO$_4$:Ge$^{4+}$, MN$^{2+}$, Y$_2$O$_3$:Eu$^{2+}$, and Sr$_4$Al$_{14}$O$_{25}$:Eu$^{2+}$ The resulting emission spectra of the blend is shown in FIG. 5. The resulting lamp had a calculated luminosity at 4100 K that was only 2.3% lower than the lamp having a CRI of 83 prepared using a known tri-phosphor blend comprising BaMgAl$_{10}$O$_{17}$:Eu$^{2+}$, LaPO$_4$:Ce$^{3+}$, Tb$^{3+}$, and Y$_2$O$_3$:Eu$^{3+}$. As stated with respect to the lamps in example 4, although the lamps having a CRI of 90–93 have a slightly lower lumen output compared to the known tri-phosphor lamp, it has a much higher CRI and the reduced luminosity is quite acceptable and actually superior to other known lamps having such a high CRI.

As stated, the phosphor blend described above may be used in many different applications. For example, the material may be used as a phosphor in lamp, in a cathode ray tube, in a plasma display device or in a liquid crystal display. The material may also be used as a scintillator in an electromagnetic calorimeter, in a gamma ray camera, in a computed tomography scanner or in a laser. These uses are meant to be merely exemplary and not exhaustive. In a preferred embodiment, the phosphor is used in a fluorescent light, as described above.

Preferably the combination of phosphors result in a predetermined color point where the x and y values are in the range of about 0.30 to about 0.40.

Additional additives may be included in the phosphor blend and can include a dispersion vehicle, binder and one or more of various known non-luminescent additives, including, e.g., alumina, calcium phosphate, thickeners, dispersing agents, and certain borate compounds as are known in the art.

In the coating procedure typically the various phosphor powders are blended by weight. The resulting powder is then dispersed in a water based system (which may contain other additives as are known in the art, including adherence promoters such as hydroxyethylcellulose or fine non-luminescent particles of alumina or calcium pyrophosphate) optionally with a dispersing agent as is known in the art. A thickener may be added, typically polyethylene oxide. The suspension is then typically diluted with deionized water until it is suitable for producing a coating of the desired thickness or coating weight. The phosphor blend suspension is then applied as a coating to the inside of the glass tube (preferably by pouring the suspension down the inside of a vertically-held tube or pumping the suspension up into same) and heated by forced air until dry, as is known in the art. After the first thin coat or layer is applied, additionally desired thin coats or layers may be applied in the same manner, carefully drying each coat before the next coat is applied. In the present invention the thin layers are built up until the total or cumulative coating thickness is sufficient to absorb substantially all of the UV light produced by the arc. This will typically be a phosphor layer of from about 4–6 particles thick. Although not intended to be limiting, this typically corresponds to a thickness of between about 1 and about 25 microns, preferably between 1 and 10 microns, depending on the exact composition of the phosphor blend and the particle size of the phosphors.

Figure 7:
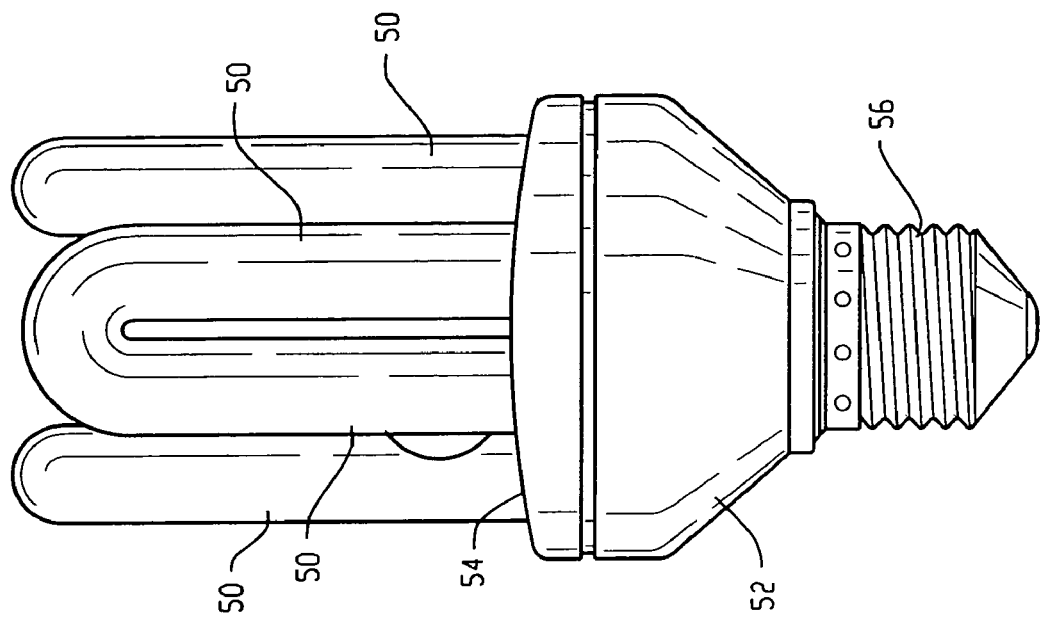
FIG. 7 is a cross-section of an alternate compact fluorescent lamp according to another embodiment of the present invention.
Figure 6:
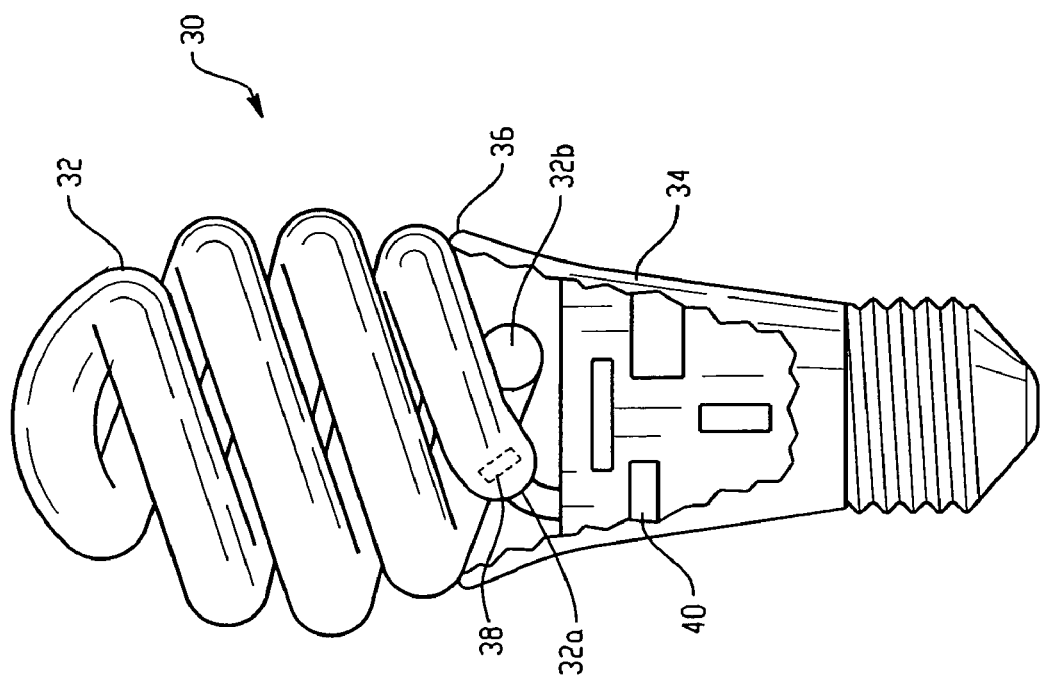
FIG. 6 is a cross-section of a compact fluorescent lamp according to an embodiment of the present invention.

While the invention has been described in detail and with reference to specific embodiments thereof, it will be apparent to one skilled in the art that various changes and modifications can be made therein without departing from the spirit and scope of the invention. For example, as can be seen in FIGS. 6 and 7, the phosphor blend of the present invention can be used in a compact fluorescent lamp arrangement. With reference to FIG. 6, a helical compact fluorescent lamp 30 is shown, having a lamp envelope or tube 32 in a coiled double helix configuration. End portions 32a, 32b enter the top portion 36 of the housing member 34; disposed within the end portions 32a, 32b are electrodes 38 which are electrically coupled to a ballast circuit arrangement 40 mounted within housing member 34. With respect to FIG. 7, a compact fluorescent lamp having a fluorescent tube 50, a housing 52 closed by a cap 54 and, according to the example, a screw base 56 is seen in side view. The compact fluorescent lamp is connected electrically to the mains through the base known in the art, and wires coming from the connection portions of the base are connected to a ballast circuit arranged inside the housing 52 and/or to electrodes of the fluorescent tube 50.

What is claimed is:

1. An arc discharge lamp having an improved luminosity for a given color rendering index and color coordinated temperature, the lamp comprising a lamp envelope enclosing a discharge space and having an inner surface;

an ionizable medium within said lamp envelope comprising mercury and an inert gas;

first and second electrodes; and a phosphor layer comprising a phosphor blend on said inner surface, said blend comprising: a green phosphor having an emission peak at 515–550 nm, an orange phosphor having an emission peak from 550–600 nm, a red phosphor having an emission peak at 600–670 nm, and a blue phosphor comprising at least one of $(Sr,Ba)MgAl_{10}O_{17}:Eu^{2+}$, $(Sr,Ca,Ba)_5(PO_4)_4Cl:Eu^{2+}$, and $(Ba,Ca)_5(PO_4)_3Cl:Eu^{2+}$.

2. A lamp according to claim 1, wherein said phosphors are mixed in proportions such that said lamp exhibits a correlated color temperature of between about 2500 to about 10000 K and a color rendering index of about 70 or greater.

3. A lamp according to claim 1, further comprising a UV reflecting barrier layer between said phosphor layer and said lamp envelope.

4. A lamp according to claim 1, wherein said phosphor layer has a median particle size of 1 to 10 microns.

5. A lamp according to claim 4, wherein said thickness of said phosphor layer is 4–6 particles thick.

6. A lamp according to claim 1, wherein said green phosphor is selected from the group consisting of $LaPO_4$: $Ce^{3+}$, $Tb^{3+}$; $CeMgAl_{11}O_{19}:Tb^{3+}$; $GdMgB_5O_{10}:Ce^{3+}$, $Tb^{3+}$, $Mn^{2+}$; $(Ba,Sr,Ca)MgAl_{10}O_{17}:Eu^{2+},Mn^{2+}$; $Zn_2(Si,Ge)O_4$: $Mn^{2+}$; $SrAl_xO_{(1+3/2x)}:Eu^{2+} (x=2–2.4)$; $(Ba,Sr,Ca)_2SiO_4$: $Eu^{2+}$; and $GdB_3O_6:Ce^{3+},Mn^{2+}$; said orange phosphor is selected from the group consisting of $(Y,In,Gd,La,Lu,Sc)BO_3:Eu^{3+}$; $YVO_4:Dy^{3+}$; $GdMgB_5O_{10}:Ce^{3+}$, $Dy^{3+}$; $(Tb, Y, Lu, La, Gd)_3(Al,Ga)_5O_{12}:Ce^{3+}$; $(Ba,Sr,Ca)_5(PO_4)_3(Cl,F,OH):Eu^{2+},Mn^{2+}$, $Sb^{3+}$; and $(Sr,Ba)GdB_8O_{16}:Eu^{3+}$; and said red phosphor is selected from the group consisting of $(Y,Gd,La,Lu, Sc)_2O_3:Eu^{3+}$; $(Y,Gd, La, In, Lu, Sc)BO_3:Eu^{3+}$; $(Y,Gd,La)(Al,Ga)O_3:Eu^{3+}$; $(Ba,Sr,Ca)(Y,Gd, La, Lu)_2O_4$: $Eu^{3+}$; $(Y,Gd)Al_3B_4O_{12}:Eu^{3+}$; monoclinic $Gd_2O_3:Eu^{3+}$; $(Gd, Y)_4(Al,Ga)_2O_9:Eu^{3+}$; $(Ca,Sr)(Gd,Y)_3(Ge,Si)Al_3O_9:Eu^{3+}$; $YVO_4:Eu^{3+}$; $(Y,Gd,La,Lu)_3GaO_6:Eu^{3+}$; $(Sr,Mg)_3(PO_4)_2$: $Sn^{2+}$; $3.5MgO-0.5MgF_2—GeO_2:Mn^{4+}$; and $GdMgB_5O_{10}$: $Ce^{3+},Mn^{2+}$.

7. A lamp according to claim 1, wherein said phosphor blend comprises $BaMgAl_{10}O_{17}:Eu^{2+}$; $Zn_2SiO_4:Ge^{4+},Mn^{2+}$; $(Y,In)BO_3:Eu^{3+}$; and $Y_2O_3:Eu^{2+}$.

8. A lamp according to claim 1, wherein said phosphor blend comprises $(Ba,Sr,Ca)_5(PO_4)_3(Cl,F,OH):Eu^{2+}$, $Mn^{2+}$, $Sb^{3+}$; $Zn_2SiO_4:Ge^{4+},Mn^{2+}$; $(Y,In)BO_3:Eu^{3+}$; and $Y_2O_3$: $Eu^{2+}$.

9. A lamp according to claim 1, wherein the spectral weight of the blue phosphor A, is $0<A<0.3$, the spectral weight of the green phosphor is B, is $0.25<B<0.6$, the spectral weight of the red phosphor is C, is $0<C<0.55$ and the spectral weight of the orange phosphor is D, is $0<D<0.55$.

10. A lamp according to claim 1, wherein said visible light has predetermined color coordinates on the CIE scale wherein the x value is in the range of 0.3 to 0.4 and y is in the range of 0.3 to 0.4.

11. An arc discharge lamp having an improved luminosity for a given color rendering index and color coordinated temperature, the lamp comprising
a lamp envelope enclosing a discharge space and having an inner surface;
an ionizable medium within said lamp envelope comprising mercury and an inert gas;
first and second electrodes; and
a phosphor layer comprising a phosphor blend on said inner surface, said blend comprising: a blue phosphor having an emission peak at 440–490 nm, a blue-green phosphor having an emission peak at 475–525 nm, a green phosphor having an emission peak at 515–550 nm, an orange phosphor having an emission peak from 550–600 nm, a deep red phosphor having an emission peak at 615–665 nm, and a red phosphor having an emission peak at 600–670 nm.

12. A lamp according to claim 11, wherein said phosphors are mixed in proportions such that said lamp exhibits a correlated color temperature of between about 2500 to about 10000 K and a color rendering index of about 90 or greater.

13. A lamp according to claim 11, further comprising a UV reflecting barrier layer between said phosphor layer and said lamp envelope.

14. A lamp according to claim 11, wherein said phosphor layer has a median particle size of 1 to 10 microns.

15. A lamp according to claim 14, wherein said thickness of said phosphor layer is 4–6 particles thick.

16. A lamp according to claim 11, wherein said blue phosphor is selected from the group consisting $(Ba,Sr,Ca)_5(PO_4)_3(Cl,F,OH):Eu^{2+}$, $Mn^{2+}$, $Sb^{3+}$; $(Ba,Sr,Ca)MgAl_{10}O_{17}$: $Eu^{2+},Mn^{2+}$; and $(Ba,Sr,Ca)BPO_5:Eu^{2+}$, $Mn^{2+}$ said blue-green phosphor is selected from the group consisting of $Sr_4Al_{14}O_{25}:Eu^{2+}$; $BaAl_8O_{13}:Eu^{2+}$; $2SrO-0.84P_2O_{5-0.16}B_2O_3:Eu^{2+}$; $MgWO_4$; $BaTiP_2O_8$; $(Ba,Sr,Ca)MgAl_{10}O_{17}$: $Eu^{2+},Mn^{2+}$; $(Ba,Sr,Ca)_4(PO_4)_3(Cl,F,OH):Eu^{2+},Mn^{2+}$, $Sb^{3+}$; said green phosphor is selected from the group consisting of $LaPO_4:Ce^{3+}$, $Tb^{3+}$; $CeMgAl_{11}O_{19}:Tb^{3+}$; $GdMgB_5O_{10}:Ce^{3+}$, $Tb^{3+}$, $Mn^{2+}$; $(Ba,Sr,Ca)MgAl_{10}O_{17}:Eu^{2+},Mn^{2+}$; $Zn_2(Si,Ge)O_4:Mn^{2+}$; $SrAl_xO_{(1+3/2x)}:Eu^{2+}$ $(x=2–2.4)$; $(Ba,Sr,Ca)_2SiO_4$: $Eu^{2+}$; and $GdB_3O_6:Ce^{3+},Mn^{2+}$; said orange phosphor is selected from the group consisting of $(Y,In,Gd,La,Lu,Sc)BO_3:Eu^{3+}$; $YVO_4:Dy^{3+}$; $GdMgB_5O_{10}:Ce^{3+}$, $Dy^{3+}$; $(Tb, Y, Lu, La, Gd)_3 (Al,Ga)_5O_{12}:Ce^{3+}$; $(Ba,Sr,Ca)_5(PO_4)_3(Cl,F,OH):Eu^{2+},Mn^{2+}$, $Sb^{3+}$; and $(Sr,Ba)GdB_8O_{16}:Eu^{3+}$; said red phosphor is selected from the group consisting of $(Y,Gd,La, Lu, Sc)_2O_3:Eu^{3+}$; $(Y,Gd, La, In, Lu, Sc)BO_3:Eu^{3+}$; $(Y,Gd, La)(Al,Ga)O_3:Eu^{3+}$; $(Ba,Sr,Ca)(Y,Gd, La, Lu)_2O_4:Eu^{3+}$; $(Y,Gd)Al_3B_4O_{12}:Eu^{3+}$; monoclinic $Gd_2O_3:Eu(Gd,Y)_4(Al, Ga)_2O_9:Eu^{3+}$; $(Ca,Sr)(Gd,Y)_3(Ge,Si)Al_3O_9:Eu^{3+}$; $YVO_4$: $Eu^{3+}$; $(Y,Gd,LaLu)_3GaO_6:Eu^{3+}$; $(Sr,Mg)_3(PO_4)_2:Sn^{2+}$; $3.5MgO-0.5MgF_2—GeO_2:Mn^{4+}$; and $GdMgB_5O_{10}:Ce^{3+}$, $Mn^{2+}$; and said deep red phosphor is selected from the group consisting of $(Sr,Mg)_3(PO_4):Sn^{2+}$; $3.5MgO-0.5MgF_2—GeO_2:Mn^{4+}$; and $GdMgB_5O_{10}:Ce^{3+}$, $Mn^{2+}$.

17. A lamp according to claim 11, wherein said phosphor blend comprises $BaMgAl_{10}O_{17}:Eu^{2+}$, $Sr_4Al_{14}O_{25}:Eu^{2+}$; $Zn_2SiO_4:Ge^{4+},Mn^{2+}$; $Y_2O_3:Eu^{2+}$ and an additional orange and deep red phosphor.

18. A lamp according to claim 11, wherein said phosphor blend comprises $(Ba,Sr,Ca)_5(PO_4)_3(Cl,F,OH):Eu^{2+}$, $Mn^{2+}$, $Sb^{3+}$; $Zn_2SiO_4:Ge^{4+},Mn^{2+}$; $Y_2O_3:Eu^{2+}$ and an additional orange and deep red phosphor.

19. A lamp according to claim 11, wherein the spectral weight of the blue phosphor, A, is $0<A<0.3$, the spectral weight of the green phosphor, B, is $0.25<B<0.6$, the spectral weight of the red phosphor, C, is $0<C<0.55$, the spectral weight of the blue green phosphor, D, is $0<D<0.3$, the spectral weight of the orange phosphor, E, is $0<E<0.55$, and the spectral weight of the deep red phosphor, F, is $0<F<0.3$.

20. A lamp according to claim 11, wherein said visible light has predetermined color coordinates on the CIE scale wherein the x value is in the range of 0.3 to 0.4 and y is in the range of 0.3 to 0.4.

* * * * *